(12) United States Patent
Silveri

(10) Patent No.: US 11,708,018 B2
(45) Date of Patent: Jul. 25, 2023

(54) ENCLOSED ROLLBACK TOW TRUCK BED AND FRAME ASSEMBLY

(71) Applicant: Michael John Silveri, Boca Raton, FL (US)

(72) Inventor: Michael John Silveri, Boca Raton, FL (US)

(73) Assignee: EM SIL Enterprises, Inc., Pompano Beach, FL (US)

( * ) Notice: Subject to any disclaimer, the term of this patent is extended or adjusted under 35 U.S.C. 154(b) by 197 days.

(21) Appl. No.: 17/110,796

(22) Filed: Dec. 3, 2020

(65) Prior Publication Data

US 2021/0387561 A1 Dec. 16, 2021

Related U.S. Application Data

(60) Provisional application No. 62/942,850, filed on Dec. 3, 2019.

(51) Int. Cl.

| | | |
|---|---|---|
| *B60P 7/02* | (2006.01) | |
| *B60P 3/12* | (2006.01) | |
| *B60P 3/07* | (2006.01) | |
| *B62D 33/04* | (2006.01) | |
| *B62D 65/06* | (2006.01) | |

(52) U.S. Cl.
CPC ............... *B60P 7/02* (2013.01); *B60P 3/122* (2013.01); *B62D 33/046* (2013.01); *B62D 65/06* (2013.01); *B60P 3/07* (2013.01); *B60Y 2200/145* (2013.01)

(58) Field of Classification Search
CPC .... B62D 21/09; B62D 21/18; B62D 25/2054; B62D 33/00; B62D 33/02; B62D 33/04; B62D 33/042; B62D 33/046; B62D 39/00; B62D 65/02; B62D 65/06; B62D 65/16; B62D 65/18; B60P 3/06; B60P 3/07; B60P 3/073; B60P 3/08; B60P 3/12; B60P 3/122; B60P 3/125; B60P 3/14; B60P 7/02; B60R 9/02; B60R 9/06; B60Y 2200/145
USPC .......................... 296/184.1, 37.6, 24.3, 24.32
See application file for complete search history.

(56) References Cited

U.S. PATENT DOCUMENTS

| | | | | |
|---|---|---|---|---|
| 2,765,938 A | * | 10/1956 | Di Addezio | ............. B60S 5/02 137/234.6 |
| 3,032,217 A | * | 5/1962 | Musson | .................... B60P 3/07 296/24.32 |
| 5,839,775 A | * | 11/1998 | Young | ..................... B60R 11/06 296/29 |

(Continued)

*Primary Examiner* — Gregory A Blankenship
(74) *Attorney, Agent, or Firm* — James David Johnson; Johnson & Martin, P.A.

(57) ABSTRACT

A frame assembly for supporting and mounting a box compartment over and around a flat bed of a flatbed tow truck is described. The frame assembly includes a frame attached to a chassis of a flatbed tow truck. The frame includes at least one left and at least one right side support beams, at least one left and at least one right horizontal connection beams, two or more left side and two or more right side vertical support beams, at least two cross-beams, and at least one vertical connection beam. One or more of the at least two cross-beams is connected to the chassis and is further connected at each of its ends to the left and right side support beams. Each vertical connection beam is connected to either the left or right horizontal connection beam and is oriented generally vertically for attachment of a box compartment to the frame.

4 Claims, 17 Drawing Sheets

(56) References Cited

U.S. PATENT DOCUMENTS

| | | | | |
|---|---|---|---|---|
| 6,099,070 | A * | 8/2000 | Yocum | B62D 33/042 296/193.04 |
| 6,120,235 | A * | 9/2000 | Humphries | B62D 21/14 296/26.03 |
| 6,135,501 | A * | 10/2000 | Rinehart | B60P 3/122 137/234.6 |
| 6,139,081 | A * | 10/2000 | Lemieux | B62D 33/044 296/37.6 |
| 6,241,308 | B1 * | 6/2001 | Gaspard, II | B60P 1/6418 410/82 |
| 6,257,823 | B1 * | 7/2001 | Kosta | B60P 3/122 296/182.1 |
| 7,909,560 | B1 * | 3/2011 | Nespor | B60P 3/122 414/538 |
| 2004/0062620 | A1 * | 4/2004 | Deets | B62D 33/0612 410/4 |
| 2012/0121368 | A1 * | 5/2012 | Kuriakose | B60P 1/28 414/477 |
| 2013/0149084 | A1 * | 6/2013 | Jaeger | B60P 1/045 414/469 |
| 2015/0343937 | A1 * | 12/2015 | Nespor | B60P 3/07 414/469 |
| 2020/0269921 | A1 * | 8/2020 | Silveri | B60R 3/00 |
| 2021/0016641 | A1 * | 1/2021 | Martindale | B60J 7/062 |
| 2021/0246003 | A1 * | 8/2021 | Wu | E04H 6/24 |
| 2021/0347586 | A1 * | 11/2021 | Proteau | B65G 67/04 |
| 2021/0387561 | A1 * | 12/2021 | Silveri | B62D 33/046 |
| 2022/0194298 | A1 * | 6/2022 | Silveri | B60R 3/007 |
| 2022/0250529 | A1 * | 8/2022 | Martin | B60P 3/07 |

* cited by examiner

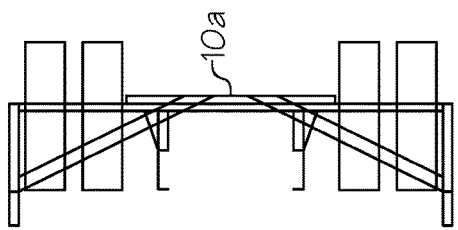
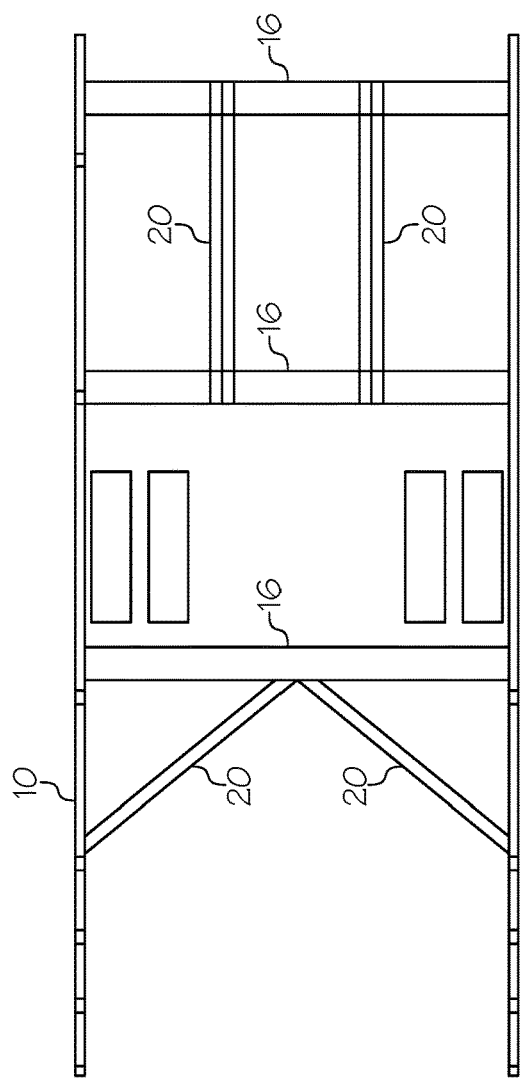
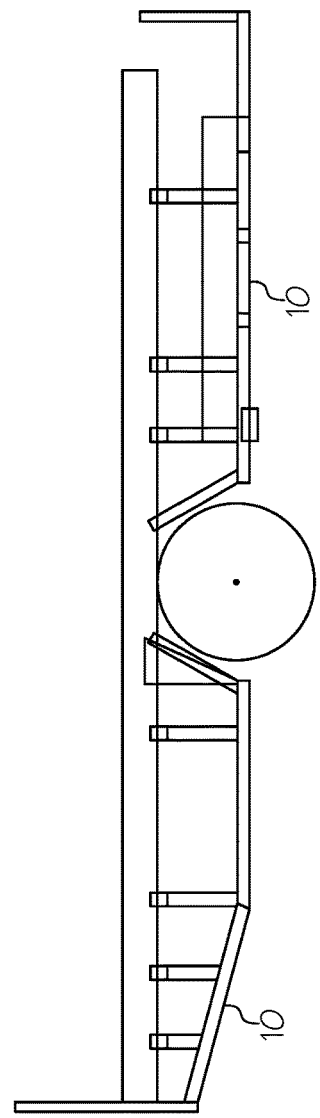
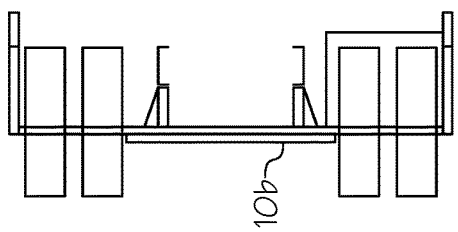

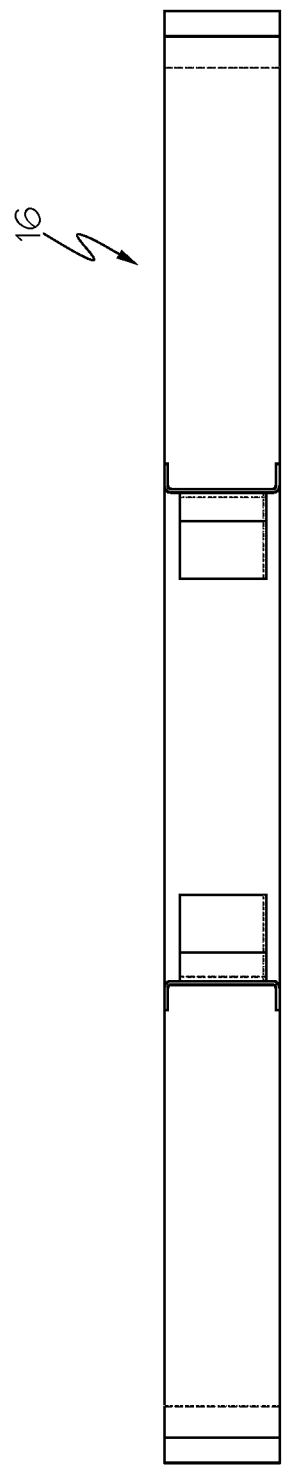
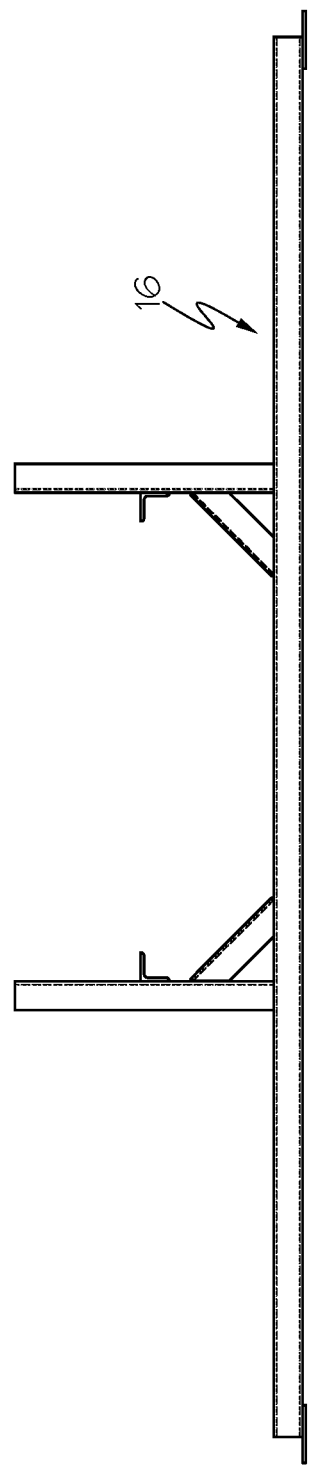

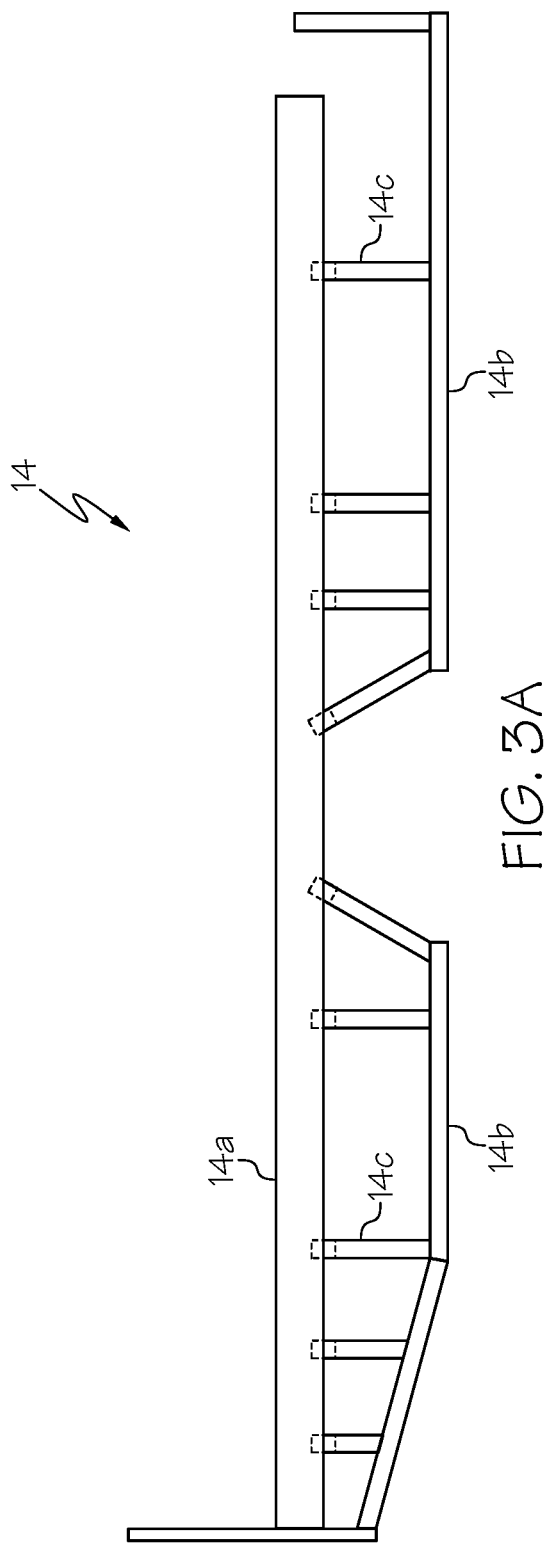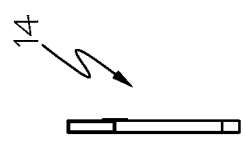
FIG. 3A
FIG. 3B

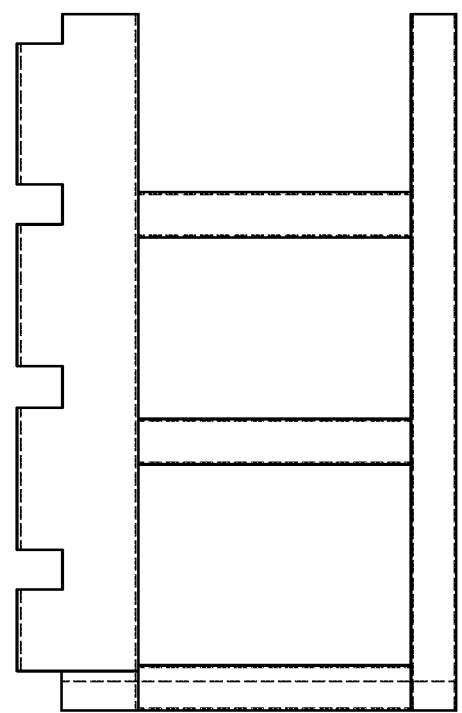
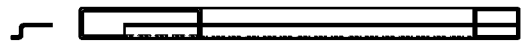

ENCLOSED ROLLBACK TOW TRUCK BED AND FRAME ASSEMBLY

CROSS-REFERENCE TO RELATED APPLICATIONS

This application is a nonprovisional application of and claims priority from U.S. provisional patent application Ser. No. 62/942,850 filed on Dec. 3, 2019. The foregoing applications are incorporated in their entirety herein by reference.

FIELD OF THE INVENTION

The invention relates to towing vehicles. More particularly, the invention relates to an enclosed rollback bed and frame assembly for a tow truck to provide an enclosed space for transporting an automobile and other items.

BACKGROUND

Tow trucks are useful for transporting disabled vehicles as well as vehicles in cases in which it is desirable to transport a vehicle without leaving the wheels of one end of the vehicle in contact with the road or other ground substrate. For example, in certain situations, it may undesirable, or even impossible for certain automobile designs, to tow the vehicle using a hook and chain tow truck or a wheel-lift tow truck. These problems are particularly acute in the cases of luxury automobiles, rare automobiles, and antique automobiles. To transport such vehicles, flatbed tow trucks are often used so that the vehicle may be placed on the flat bed and transported atop that bed without any portion of the vehicle contacting the road.

With all of the advantages provided by a standard flatbed tow truck, when luxury, rare, and antique automobiles are being transported (due to breakdown or for general transportation purposes), transportation of the vehicle in a manner that protects it from road debris, weather, and other physical contact by unauthorized persons, animals, or objects, may be highly desirable. Further, transporting the vehicle on a flatbed that does not require the vehicle to drive off the flat bed at a steep grade, which could damage a vehicle that sits low relative to the point at which its tires contact the bed, as well as those that have long front or rear ends, may be desirable or necessary.

A need exists for a flatbed tow truck capable of transporting an automobile or other object within an enclosed space that prevents contact to the vehicle or other object by weather, persons, animals, road debris, and other objects. A need also exists for retrofitting an existing flatbed tow truck with an attached box compartment to define an enclosed space around a flat bed of the truck. A further need exists for a flatbed tow truck capable of allowing an automobile stored within an enclosed space on a flat bed of the truck to be positioned on and removed from the flat bed at a low, as opposed to steep, grade to avoid damage to the automobile during loading and unloading of the vehicle from the flatbed tow truck.

SUMMARY

The invention relates to a frame for supporting and mounting a box compartment over and around a tow truck bed. The frame is attachable to a chassis of a truck, e.g., a flatbed tow truck. The frame includes at least one left and at least one right side support beams, at least one left and at least one right horizontal connection beams, two or more left side and two or more right side vertical support beams, at least two cross-beams, and at least one vertical connection beam. Each cross-beam is connected to the chassis of the flatbed tow truck and is further connected at each of its ends to the left and right side support beams. Each vertical connection beam is connected to either the left or right horizontal connection beam and is oriented generally vertically for attachment of a box compartment to the frame.

The frame may also include one or more stabilization beams. The stabilization beams may be oriented diagonally or perpendicularly in their connection to other beams of the frame. For example, a stabilization beam may be connected in a generally horizontal orientation diagonally between one of the side support beams and one of the cross-beams. In another example, a stabilization beam may be connected in a generally horizontal orientation perpendicularly between two of the cross-beams.

The beams may be constructed from steel tubing that surrounds a hollow interior space. The steel tubing may be square or rectangular in cross section, although in some embodiments, the steel tubing may have a different cross-sectional shape such as circular. The beams are welded together when the frame is constructed.

The invention also relates to a frame assembly that includes a frame as described herein. The frame assembly can further include a box compartment for installing on the frame. The frame assembly (or the frame alone) may be provided as a system or kit for installing on an existing truck to add a box compartment over and around the flat bed of the flatbed tow truck.

The invention also relates to a combination flatbed tow truck and box compartment system for transporting an object in an enclosed space defined within the box compartment. The system includes a frame assembly having a frame, as described herein, and a box compartment. In various embodiments of the system, the frame is attached to a chassis of the flatbed tow truck, and the box compartment is attached to the frame.

The frame provides an advantage in that it allows the attachment of a box compartment that is mounted over and around a tow truck bed, e.g., over and around a rollback bed of a flatbed tow truck, thereby permitting a vehicle being transported on the flat bed of the tow truck to be completely enclosed and protected from contact by weather, persons, animals, road debris, and other objects. This advantage is particularly useful in the case of transporting luxury, rare, and antique automobiles. The frame also provides an advantage in that a flat bed of a flatbed tow truck capable of transporting an automobile or other object may be converted to an enclosed space by connecting a box compartment to the frame, which prevents contact to the vehicle or other object by weather, persons, animals, road debris, and other objects. Another advantage of the frame and frame assembly is that they permit an existing flatbed tow truck to be retrofitted with an attached box compartment to define an enclosed space around a flat bed of the truck. Yet another advantage of the frame and frame assembly is that they permit the creation of a flatbed tow truck capable of allowing an automobile stored within an enclosed, protected space on a flat bed of the truck to be positioned on and removed from the flat bed at a low, as opposed to steep, grade to avoid damage to the automobile during loading and unloading of the vehicle from the flatbed tow truck.

Accordingly, the invention features a frame attachable to a chassis of a flatbed tow truck for attachment of a box compartment over and around a flat bed of the flatbed tow truck. The frame includes a left side structure, wherein the left side structure is oriented generally vertically. The left side structure is connectable to and supports a left side of a box compartment. The frame also includes a right side structure, wherein the right side structure is oriented generally vertically. The right side structure is connectable to and supports a right side of the box compartment. The frame also includes at least two cross-beams, wherein each cross-beam is connected at a first end generally perpendicularly to the left side structure and at a second end generally perpendicularly to the right side structure. The frame also includes at least one vertical connection beam, wherein each vertical connection beam is connected to or is an integral part of either the left or right side structure. Each vertical connection beam is oriented generally vertically for attachment of the box compartment to the frame. The frame is attachable to a bottom side of a chassis of a flatbed tow truck to support and secure the box compartment over a flat bed of the flatbed tow truck.

In another aspect, the invention can feature the left side structure having and including at least one left side support beam, at least one left horizontal connection beam, and two or more left side vertical support beams.

In another aspect, the invention can feature the right side structure having and including at least one right side support beam, at least one right horizontal connection beam, and two or more right side vertical support beams.

In another aspect, the invention can feature the at least one left side support beam being connected to the at least one left horizontal connection beam by the two or more left side vertical support beams.

In another aspect, the invention can feature the at least one right side support beam being connected to the at least one right horizontal connection beam by the two or more right side vertical support beams.

In another aspect, the invention can feature each of the left and right side structures being or including one or more left side vertical support beams.

In another aspect, the invention can feature the at least one vertical connection beam including front left, front right, rear left, and rear right vertical connection beams. The front left, front right, rear left, and rear right vertical connection beams are connectable to the box compartment at or near corresponding front left, front right, rear left, and rear right corners of the box compartment.

In another aspect, the invention can feature the frame further including one or more stabilization beams for bracing the left side structure, the right side structure, the at least two cross-beams, the at least one vertical connection beam, or a combination of two or more of the foregoing. Each of the one or more stabilization beams connects between two other beams of the frame.

In another aspect, the invention can feature each of the one or more stabilization beams being oriented diagonally or perpendicularly in its connection to another beam of the frame.

In another aspect, the invention can feature a stabilization beam of the one or more stabilization beams being connected in a generally horizontal orientation diagonally between a side support beam of the left or right side structures and one of the at least two cross-beams.

In another aspect, the invention can feature a stabilization beam of the one or more stabilization beams being connected in a generally horizontal orientation perpendicularly between two of the at least two cross-beams.

In another aspect, the invention can feature a stabilization beam of the one or more stabilization beams being connected in a generally vertically orientation diagonally between a side support beam of the left or right side structures and one of the at least two cross-beams.

The invention also features a frame assembly for supporting and mounting a box compartment mounted over and around a flat bed of a tow truck. The frame assembly includes a frame attached to a chassis of a tow truck. The frame includes at least one left side support beam, at least one right side support beam, at least one left horizontal connection beam, at least one right horizontal connection beam, two or more left side vertical support beams, and two or more right side vertical support beams. The frame also includes at least two cross-beams, wherein each cross-beam is connected to the chassis of the tow truck and is further connected at a first end generally perpendicularly to the left side support beam and at a second end generally perpendicularly to the right side support beam. The frame also includes at least one vertical connection beam, wherein each vertical connection beam is connected to either the left or right horizontal connection beam and is oriented generally vertically for attachment of a box compartment to the frame. The at least one left side support beam is connected to the at least one left horizontal connection beam by the two or more left side vertical support beams. The at least one right side support beam is connected to the at least one right horizontal connection beam by the two or more right side vertical support beams.

In another aspect, the invention can feature the at least one vertical connection beam including front left, front right, rear left, and rear right vertical connection beams. The front left, front right, rear left, and rear right vertical connection beams are connectable to the box compartment at or near corresponding front left, front right, rear left, and rear right corners of the box compartment.

In another aspect, the invention can feature the frame assembly further including one or more stabilization beams for bracing a left side structure of the frame assembly, a right side structure of the frame assembly, the at least two cross-beams, the at least one vertical connection beam, or a combination of two or more of the foregoing. Each stabilization beam connects between two other beams of the frame assembly. The left side structure is or includes the at least one left side support beam, the at least one left horizontal connection beam, and the two or more left side vertical support beams. The right side structure is or includes the at least one right side support beam, the at least one right horizontal connection beam, and the two or more right side vertical support beams. Each of the one or more stabilization beams is oriented diagonally or perpendicularly in its connection between two other beams of the frame assembly.

In another aspect, the invention can feature the beams of the frame being or including steel tubing.

In another aspect, the invention can feature the frame assembly further including a box compartment.

The invention also features a combination flatbed tow truck and box compartment system for transporting an object in an enclosed space defined within the box compartment. The system includes a flatbed tow truck having a flat bed and a chassis, a box compartment, and a frame. The box compartment includes a roof and at least two walls, wherein the roof and at least two walls define an enclosed space into which an object is placeable for transport or storage. The frame is connectable to a bottom side of the chassis of the flatbed tow truck to support and secure the box compartment over the flat bed. The frame includes a left side structure, wherein the left side structure is oriented generally vertically. The left side structure is connectable to and supports a left side of the box compartment. The frame also includes a right side structure, wherein the right side structure is oriented generally vertically. The right side structure is connectable to and supports a right side of the box compartment. The frame also includes at least two cross-beams and at least one vertical connection beam. Each cross-beam is connected at a first end generally perpendicularly to the left side structure and at a second end generally perpendicularly to the right side structure. Each vertical connection beam is connected to or is an integral part of either the left or right side structure, and each vertical connection beam is oriented generally vertically for attachment of the box compartment to the frame.

In another aspect, the invention can feature the at least one vertical connection beam including front left, front right, rear left, and rear right vertical connection beams. The front left, front right, rear left, and rear right vertical connection beams are connectable to the box compartment at or near corresponding front left, front right, rear left, and rear right corners of the box compartment.

In another aspect, the invention can feature the system further including one or more stabilization beams for bracing the left side structure, the right side structure, the at least two cross-beams, the at least one vertical connection beam, or a combination of two or more of the foregoing. Each stabilization beam connects between two other beams of the system. The left side structure includes at least one left side support beam, at least one left horizontal connection beam, and two or more left side vertical support beams. The right side structure includes at least one right side support beam, at least one right horizontal connection beam, and two or more right side vertical support beams. Each of the one or more stabilization beams is oriented diagonally or perpendicularly in its connection between two other beams of the system.

In another aspect, the invention can feature the frame further including one or more central connection elements for attaching the frame to the chassis, wherein the one or more central connection elements are connected to one or more of the at least two cross-beams and extend vertically or diagonally upward therefrom.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIG. 1A is a top plan schematic view of a rear portion of a frame that is attachable to a chassis of a flatbed tow truck for attachment of a box compartment over and around a flat bed of the flatbed tow truck.

FIG. 1B is a top plan schematic view of a middle portion of the frame of FIG. 1A.

FIG. 1C is a top plan schematic view of a front portion of the frame of FIG. 1A.

FIG. 1D is a side schematic view of a frame that is attachable to a chassis of a flatbed tow truck for attachment of a box compartment over and around a flat bed of the flatbed tow truck.

FIG. 2A is top plan schematic view of a cross-beam of the frame of FIG. 1A.

FIG. 2B is a side schematic view of the cross-beam of FIG. 2A.

FIG. 3A is a side schematic view of a right side structure of the frame of FIG. 1A.

FIG. 3B is a schematic view of a component of the right side structure of FIG. 3A.

FIG. 6A is a left side end view of a forward frame insert of the frame of FIG. 1A.

FIG. 6B is a top plan view of the forward frame insert of FIG. 6A.

FIG. 6C is a side view of the forward frame insert of FIG. 6A.

FIG. 6D is a right side end view of the forward frame insert of FIG. 6A.

DETAILED DESCRIPTION

Figure 4B:
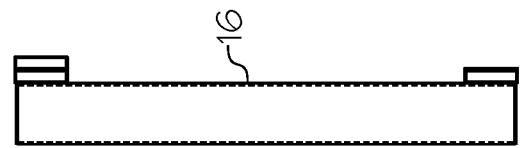
FIG. 4B is a schematic view of a beam of the cross-beam assembly of FIG. 4A with a stiffener.
Figure 4D:
FIG. 4D is a schematic view of another beam of the cross-beam assembly of FIG. 4A with a stiffener.
Figure 4A:
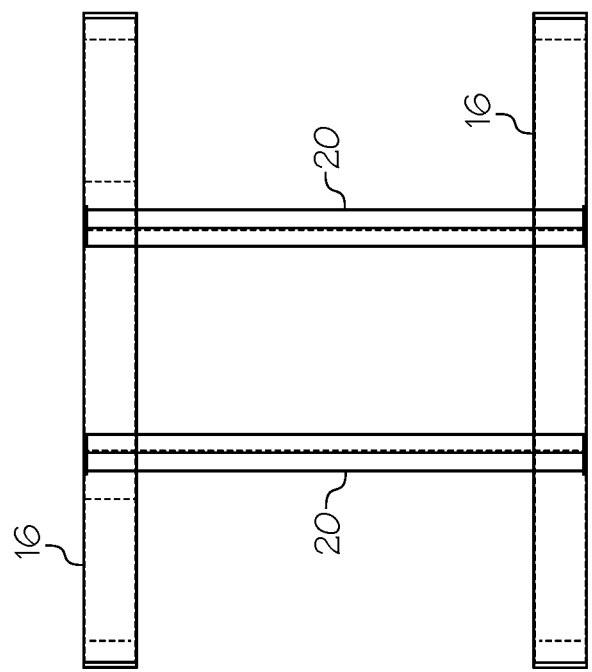
FIG. 4A is a top plan schematic view of two cross-beams of the frame of FIG. 1A connected together to form a cross-beam assembly.
Figure 4C:
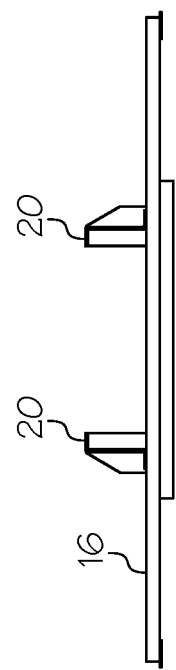
FIG. 4C is a side schematic view of a support beam of the cross-beam assembly of FIG. 4A.
Figure 5D:
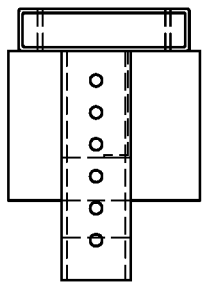
FIG. 5D is a side end view of the component of the stabilization assembly of FIG. 5A.
Figure 5A:
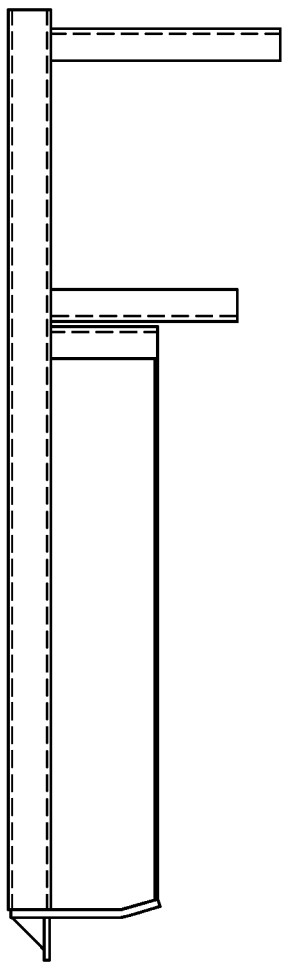
FIG. 5A is a right side view of a component of a stabilization assembly of the frame of FIG. 1A for stabilizing a rear portion of the frame.
Figure 5B:
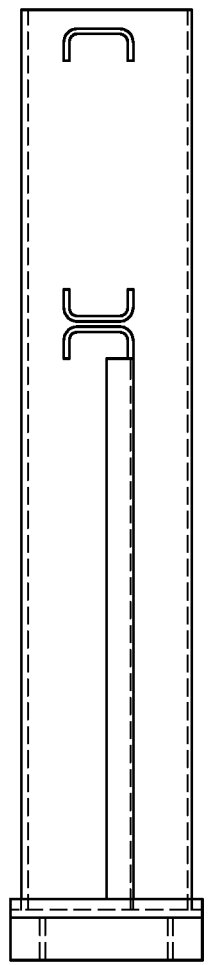
FIG. 5B is a top plan view of the component of the stabilization assembly of FIG. 5A.
Figure 5C:
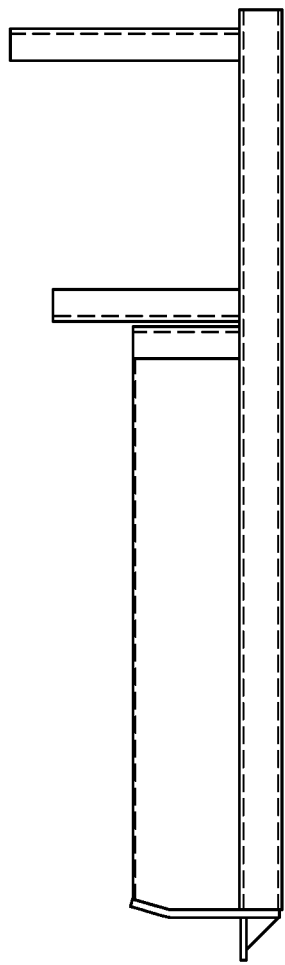
FIG. 5C is a left side view of the component of the stabilization assembly of FIG. 5A.
Figure 7:
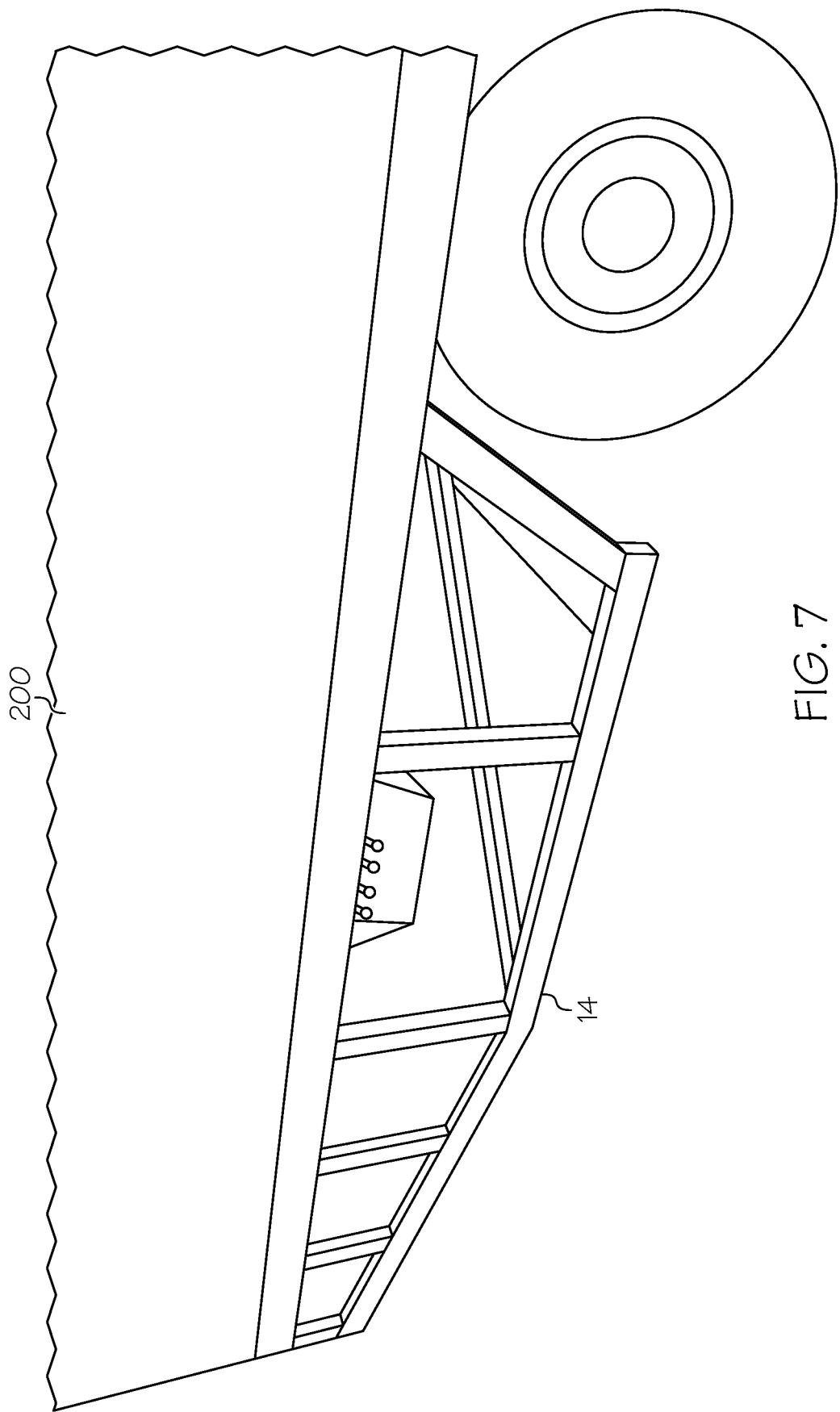
FIG. 7 is a perspective view of a rear portion of a right side structure of the frame attached to a box compartment of a flatbed tow truck.
Figure 8:
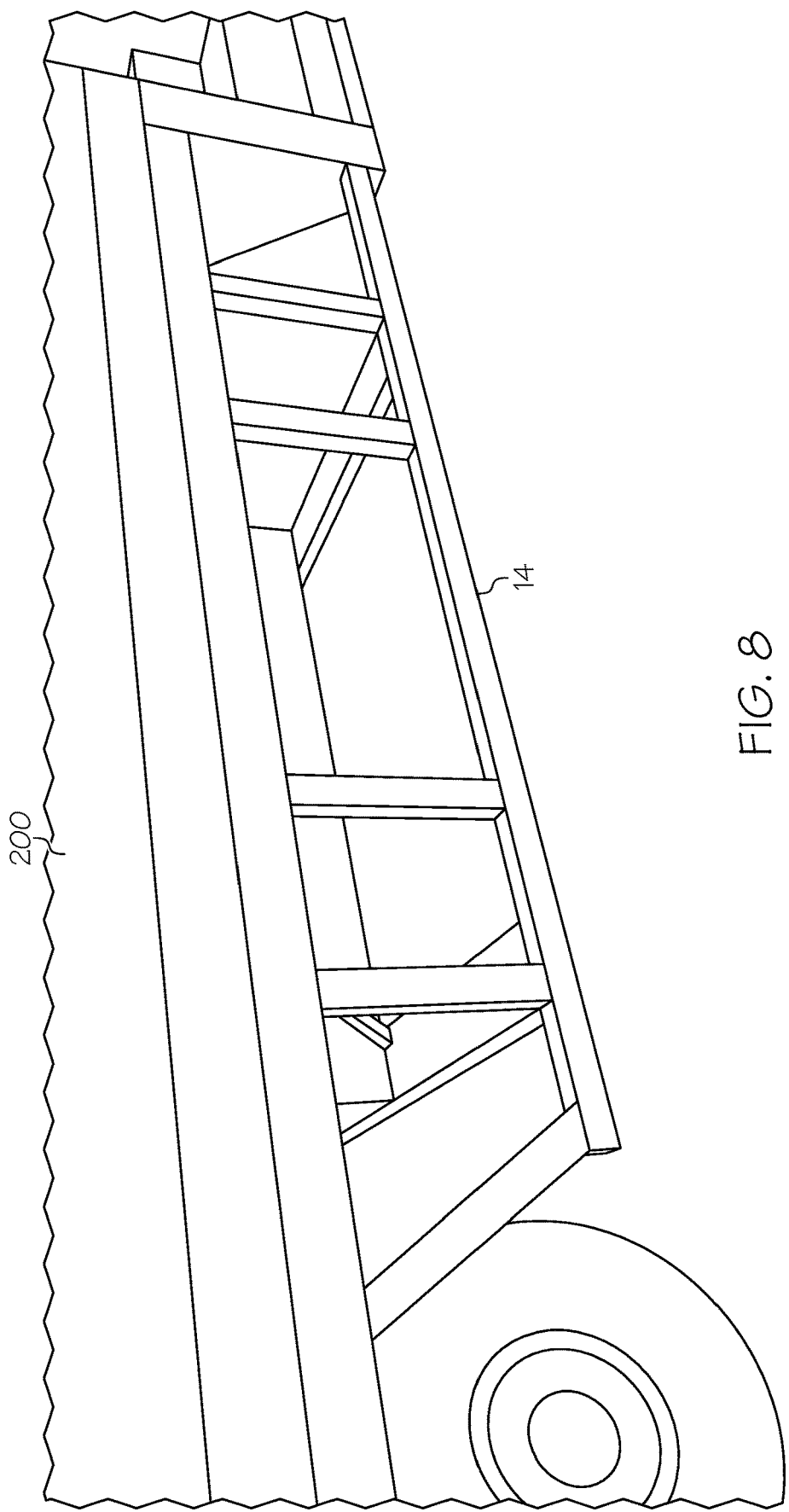
FIG. 8 is a perspective view of a middle portion of the right side structure of FIG. 7 attached to the box compartment of the flatbed tow truck.
Figure 9:
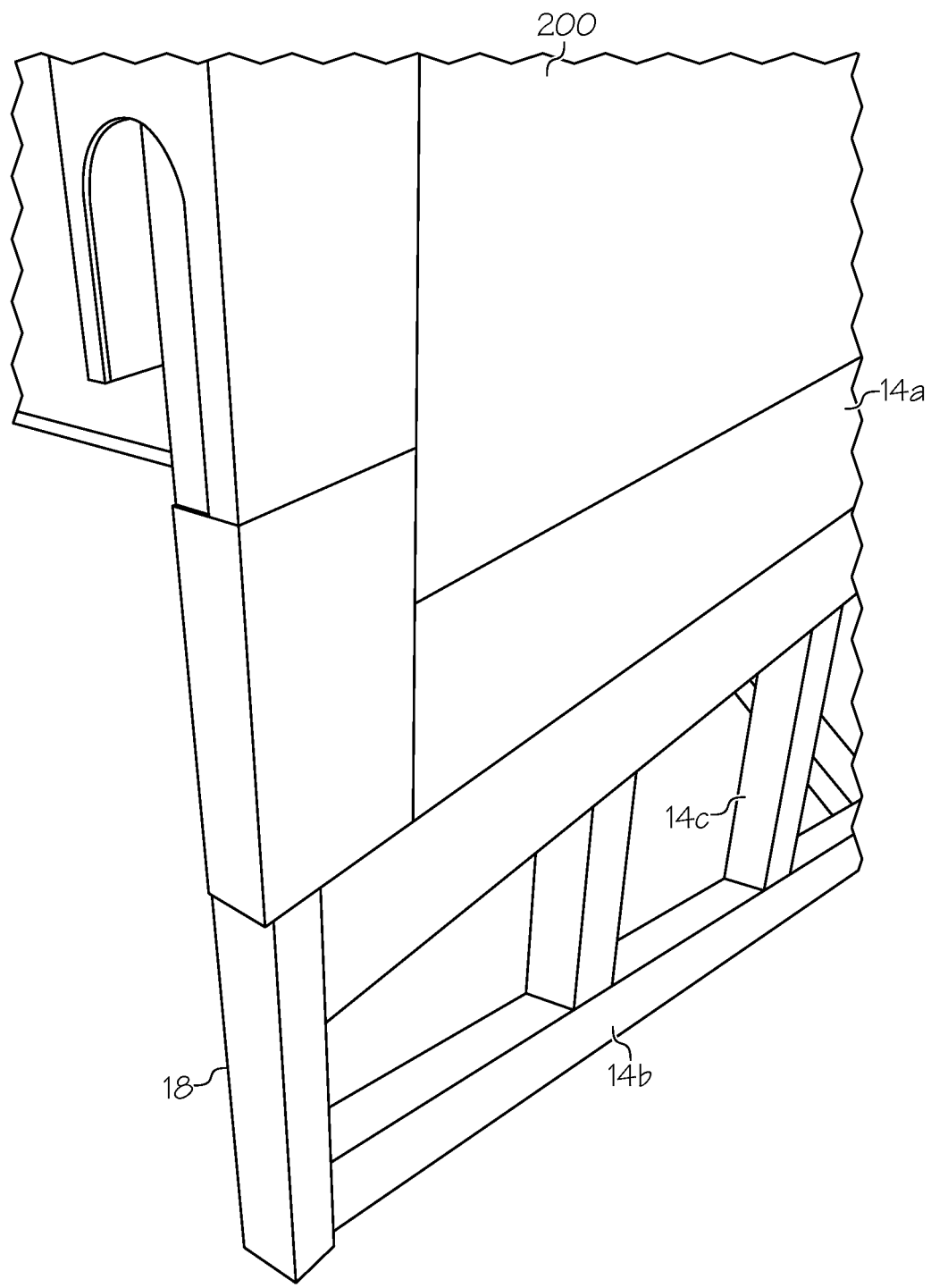
FIG. 9 is a partial right perspective view of the rear portion of the right side structure of FIG. 7 showing a vertical connection beam of the frame attached to the box compartment of the flatbed tow truck.
Figure 10:
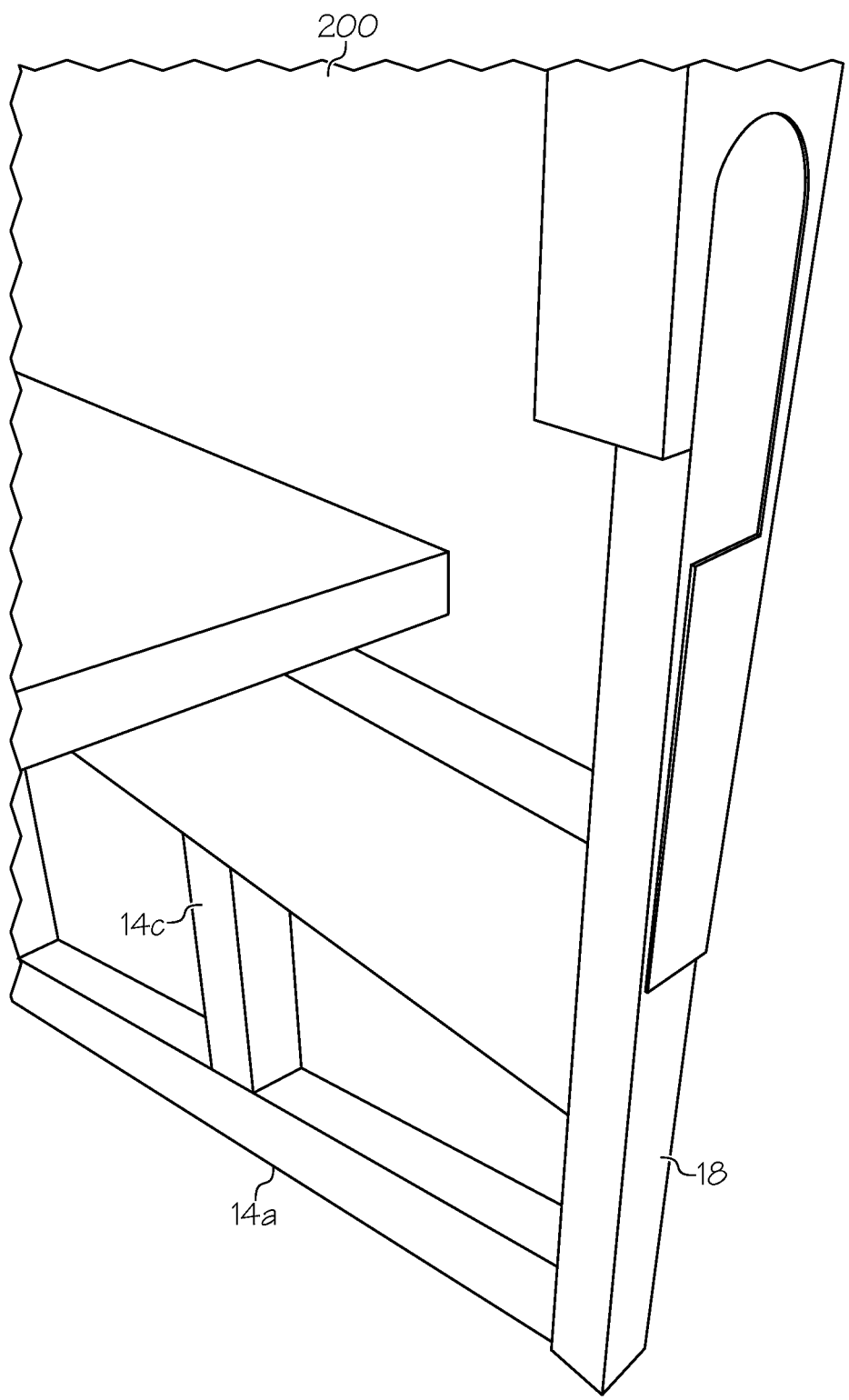
FIG. 10 is a partial left perspective view of the rear portion of the right side structure of FIG. 7 showing the vertical connection beam of the frame attached to the box compartment of the flatbed tow truck.
Figure 11:
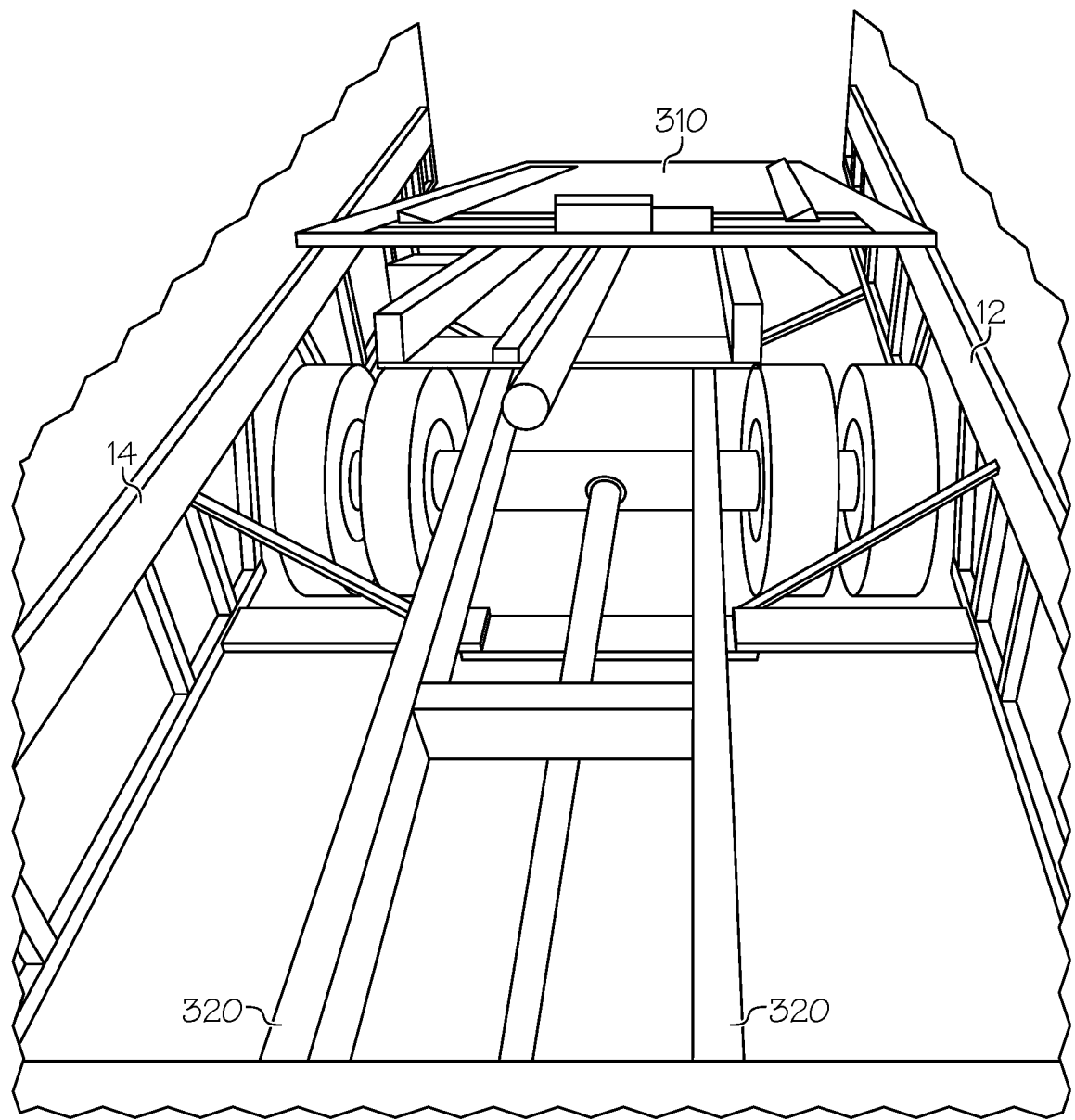
FIG. 11 is a top perspective view of the frame of FIG. 1A attached to a chassis of a flatbed tow truck.
Figure 12:
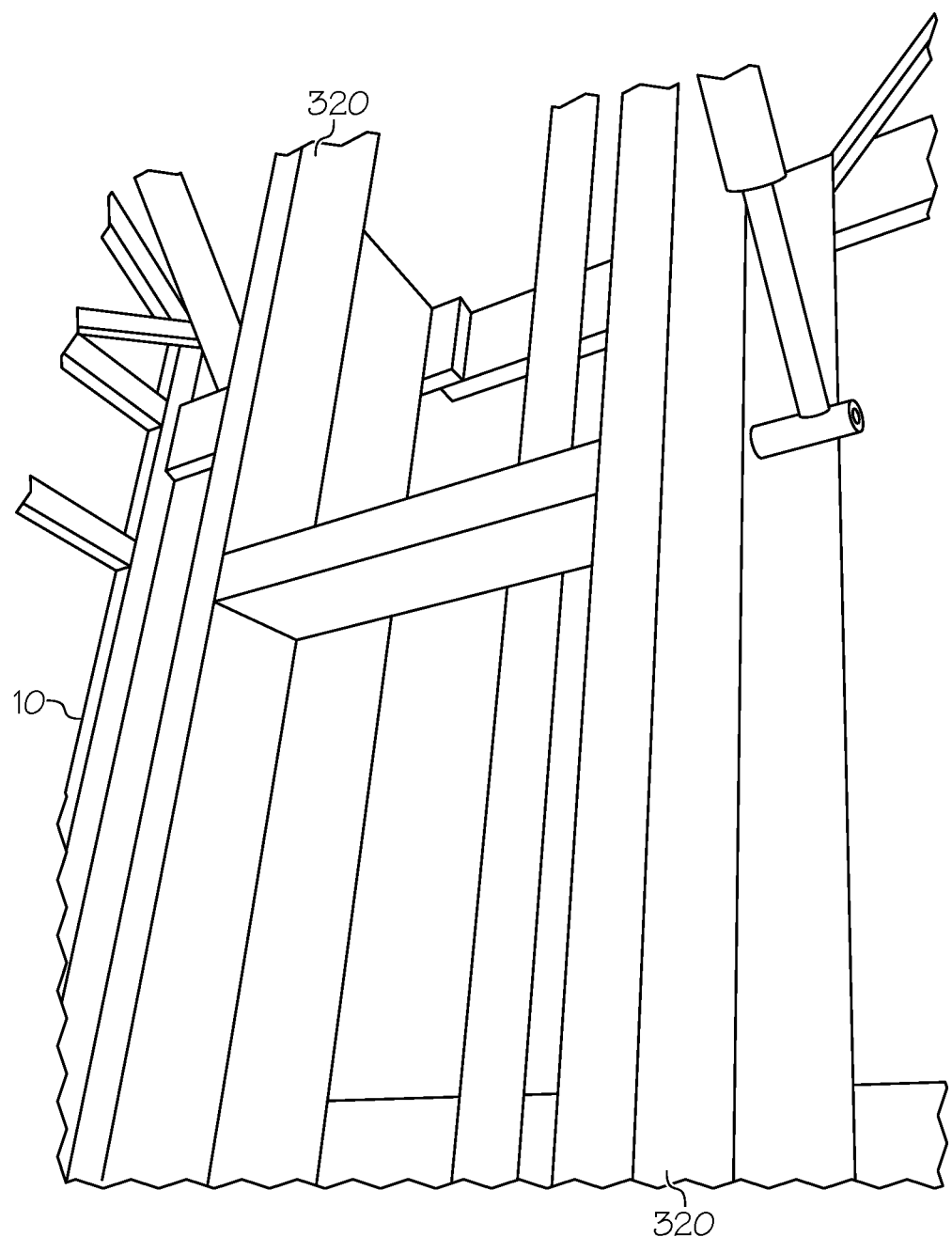
FIG. 12 is a close-up top perspective view of the frame of FIG. 11 attached to the chassis.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

As shown in FIGS. 1-17, the invention provides a frame 10 for supporting and mounting a box compartment 200 mounted over and around a bed 310 of a tow truck 300, e.g., over and around a flat bed 310 of a flatbed tow truck 300. For convenience, and not as any limitation, the tow truck or flatbed tow truck may also be referred to herein simply as a truck 300. The frame 10 is attachable to a chassis 320 of a flatbed tow truck 300. For example, in exemplary embodiments, the frame 10 is attachable to a bottom side, a left side, a right side, or a combination of two or more of the foregoing sides of the chassis 320. In other embodiments, the frame 10 may be at least partially attachable to a top side of the chassis 320. The tow truck is a flatbed tow truck 300 of the rollback type in which the flat bed 310 can be rolled back in relation to the stationary chassis 320 of the truck and then tilted between a horizontal and downward diagonal orientation to allow for loading and unloading of an automobile onto and off of the flat bed. The flat bed 310 of the flatbed town truck 300 is extendable and retractable relative to the chassis 320 of the truck. In the downward diagonal orientation, a front portion of the flat bed 310 may be elevated at an upward angle partially within or outside of the box compartment 200, while a rear portion of the flat bed is tilted downward so as to be in contact with or near to a ground substrate, e.g., a garage floor, road, parking lot surface, etc.

The frame includes a front portion 10a and a rear portion 10b as shown in FIGS. 1A and 1C The frame 10 includes a left side structure 12, a right side structure 14, at least two cross-beams 16, and at least one vertical connection beam 18. In exemplary embodiments, the frame 10 also includes one or more stabilization beams 20. In exemplary embodiments, the frame 10 and its components are constructed from steel beams or steel tubing, which are welded together to create the frame. In other embodiments, the frame 10 and its components can be constructed from aluminum, alloys, plastics, composite materials, or any other suitable material having the strength to both connect securely and immovably to the chassis and to permit secure attachment to and support of a box compartment.

The left side structure 12 of the frame 10 is oriented generally vertically and is connectable to and supports a left side of a box compartment 200. Although the left side structure 12 is flatter in its vertical aspect than in its horizontal aspect and is oriented generally vertically to meet and connect to a side wall of the box compartment 200, the left side structure is longer horizontally than its vertical height. Horizontally, the left side structure 12 is parallel to the chassis 320 when the frame 10 is installed by connection to the chassis. The left side structure 12 includes at least one left side support beam 12a, at least one left horizontal connection beam 12b, and two or more left side vertical support beams 12c. The at least one left side support beam 12a forms a horizontal top portion of the left side structure 12. The at least one left horizontal connection beam 12b runs parallel below the at least one left side support beam 12a and forms a horizontal bottom portion of the left side structure 12. The at least one left side support beam 12a and the at least one left horizontal connection beam 12b are connected together by the two or more left side vertical support beams 12c. Each of the two or more left side vertical support beams 12c includes a first end that is securely attached to a bottom or side surface of one or more of the at least one left side support beams 12a and a second end that is securely attached to a top or side surface of one or more of the at least one left horizontal connection beams 12b.

The right side structure 14 of the frame 10 is oriented generally vertically and is connectable to and supports a right side of the box compartment 200. Similar to the left side structure 12, although the right side structure 14 is flatter in its vertical aspect than in its horizontal aspect and is oriented generally vertically to meet and connect to a side wall of the box compartment 200, the right side structure 14 is longer horizontally than its vertical height. Horizontally, the right side structure 14 is parallel to the chassis 320 when the frame 10 is installed by connection to the chassis. The right side structure 14 includes at least one right side support beam 14a, at least one right horizontal connection beam 14b, and two or more right side vertical support beams 14c. The at least one right side support beam 14a forms a horizontal top portion of the right side structure 14. The at least one right horizontal connection beam 14b runs parallel below the at least one right side support beam 14a and forms a horizontal bottom portion of the right side structure 14. The at least one right side support beam 14a and the at least one right horizontal connection beam 14b are connected together by the two or more right side vertical support beams 14c. Each of the two or more right side vertical support beams 14c includes a first end that is securely attached to a bottom or side surface of one or more of the at least one right side support beams 14a and a second end that is securely attached to a top or side surface of one or more of the at least one right horizontal connection beams 14b.

Each of the left and right side structures 12, 14 may include two or more horizontal connection beams 12b or 14b arranged in parallel and all connected by one or more vertical support beams 12c or 14c to the corresponding (i.e., left or right) side support beam 12a or 14a above them. By including two or more horizontal connection beams in the left (or right) side structure, a gap or space may be left between an end of one horizontal connection beam and an opposing end of another horizontal connection beam to accommodate wheels or tires of the truck 300.

Each cross-beam 16 of the frame's at least two cross-beams 16 is connected at a first end generally perpendicularly to the left side structure 12 and at a second end generally perpendicularly to the right side structure 14. Each cross-beam 16 may be connected horizontally between one or more beams of the left side structure 12 at a first end and one or more beams of the right side structure 14 at a second end. One or more of the cross-beams 16 may be attached to the chassis 320 of the truck 300 (e.g., by welding) to connect the frame 10 to the chassis. Each of the cross-beams 16 may be about the same length and extend from a connection at the first end to the left side structure 12 to a connection at the second end to the right side structure 14. In other embodiments of the frame 10, some cross-beams 16 may have lengths that differ from other cross-beams. In such embodiments, some cross-beams 16 may be shorter than others and may not extend between and connect to both the left and right side structures 12 and 14. For example, a short cross-beam may connect at its first end to the left (or right) side structure and to one or more stabilization beams or to one or more central connection elements at its second end.

Each vertical connection beam 18 is connected to or is an integral part of either the left or right side structure 12 or 14. Each vertical connection beam 18 is oriented generally vertically for attachment of the box compartment 200 to the frame 10. In exemplary embodiments, the frame 10 includes front left, front right, rear left, and rear right vertical connection beams 18. The front left, front right, rear left, and rear right vertical connection beams 18 are connectable to the box compartment 200 at or near corresponding front left, front right, rear left, and rear right corners of the box compartment, e.g., at the bottom corners of the box compartment.

In exemplary embodiments, the frame 10 includes the one or more stabilization beams 20 for bracing the left side structure 12, the right side structure 14, the at least two cross-beams 16, the at least one vertical connection beam 18, or a combination of two or more of the foregoing. Each of the one or more stabilization beams 20 connects between two other beams of the frame 10. For example, a stabilization beam 20 may be installed between and connected to one or more beams of the left (or right) side structure 12 or 14 at a first end (e.g., to one or more of the at least one left (or right) side support beams 12a or 14a, to one or more of the at least one left (or right) horizontal connection beams 12b or 14b, and/or to one or more of the two or more left (or right) side vertical support beams 12c or 14c of the left (or right) side structure) and to one or more cross-beams 16 at a second end. In another example, a stabilization beam 20 may be installed between and connected to one or more of the at least one vertical connection beams 18 at a first end and to one or more cross-beams 16 at a second end. In still another example, a stabilization beam 20 may be installed between and connected to one or more cross-beams 16 at a first end and to one or more other cross-beams 16 at a second end. Each of the one or more stabilization beams 20 is oriented diagonally or perpendicularly in its connection to another beam of the frame 10.

In one exemplary embodiment of the frame 10, a stabilization beam 20 of the one or more stabilization beams is connected in a generally horizontal orientation diagonally between a side support beam 12a or 14a of the left or right side structures 12 or 14 and one of the at least two cross-beams 16. Several (e.g., 2, 3, 4, 5, or more) stabilization beams 20 may be connected in such manner between a side support beam 12a or 14a of the left or right side structures 12 or 14 and one of the at least two cross-beams 16.

In another exemplary embodiment of the frame 10, a stabilization beam 20 of the one or more stabilization beams is connected in a generally horizontal orientation perpendicularly between two of the at least two cross-beams 16. Several (e.g., 2, 3, 4, 5, or more) stabilization beams 20 may be connected in such manner between two of the at least two cross-beams 16.

In another exemplary embodiment of the frame 10, a stabilization beam 20 of the one or more stabilization beams is connected in a generally vertically orientation diagonally between a side support beam 12a or 14a of the left or right side structures 12 or 14 and one of the at least two cross-beams 16. Several (e.g., 2, 3, 4, 5, or more) stabilization beams 20 may be connected in such manner between a side support beam 12a or 14a of the left or right side structures 12 or 14 and one of the at least two cross-beams 16.

Figure 13:
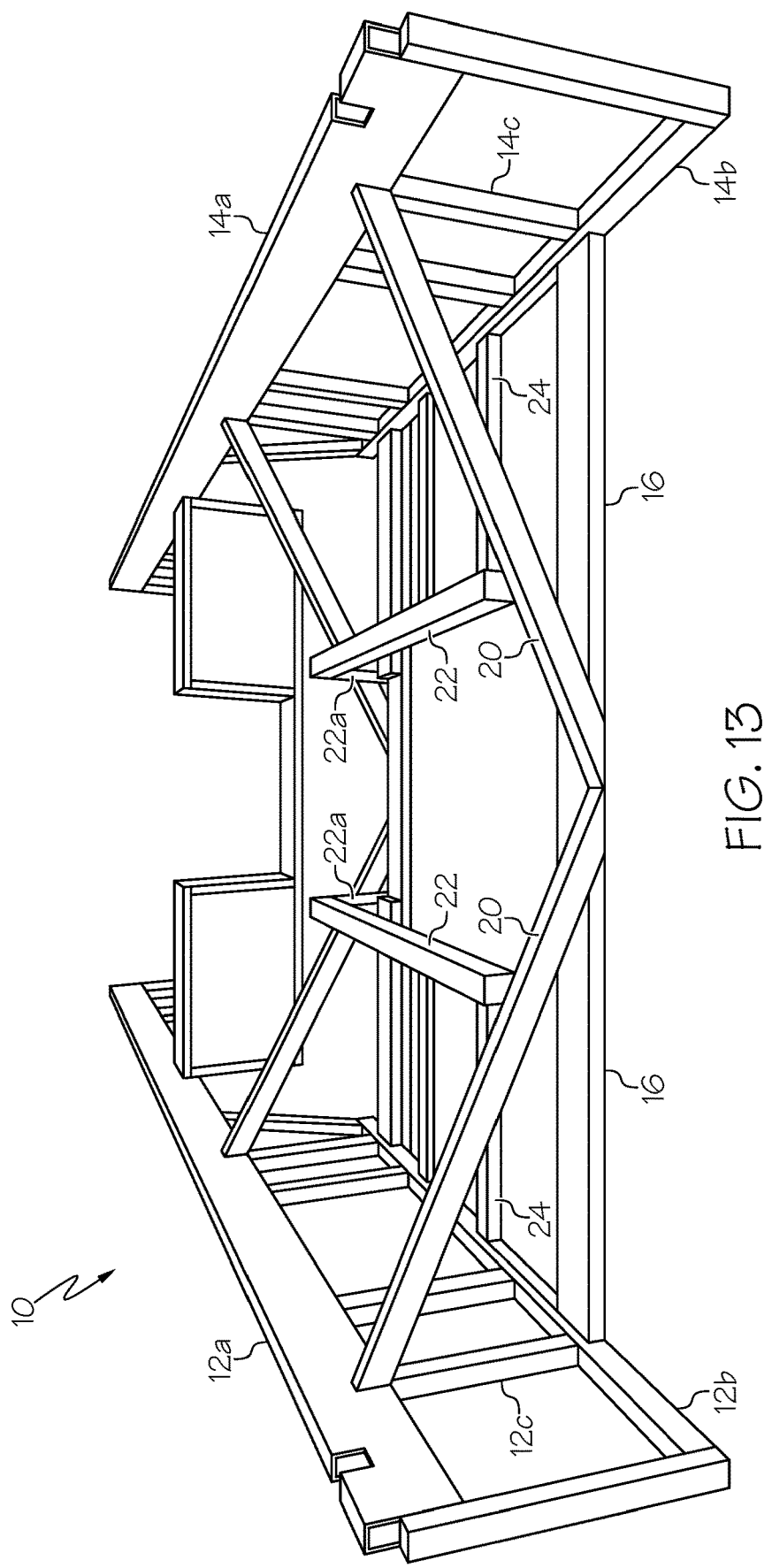
FIG. 13 is a rear perspective view of a frame before attachment to a chassis of a flatbed tow truck.
Figure 14:
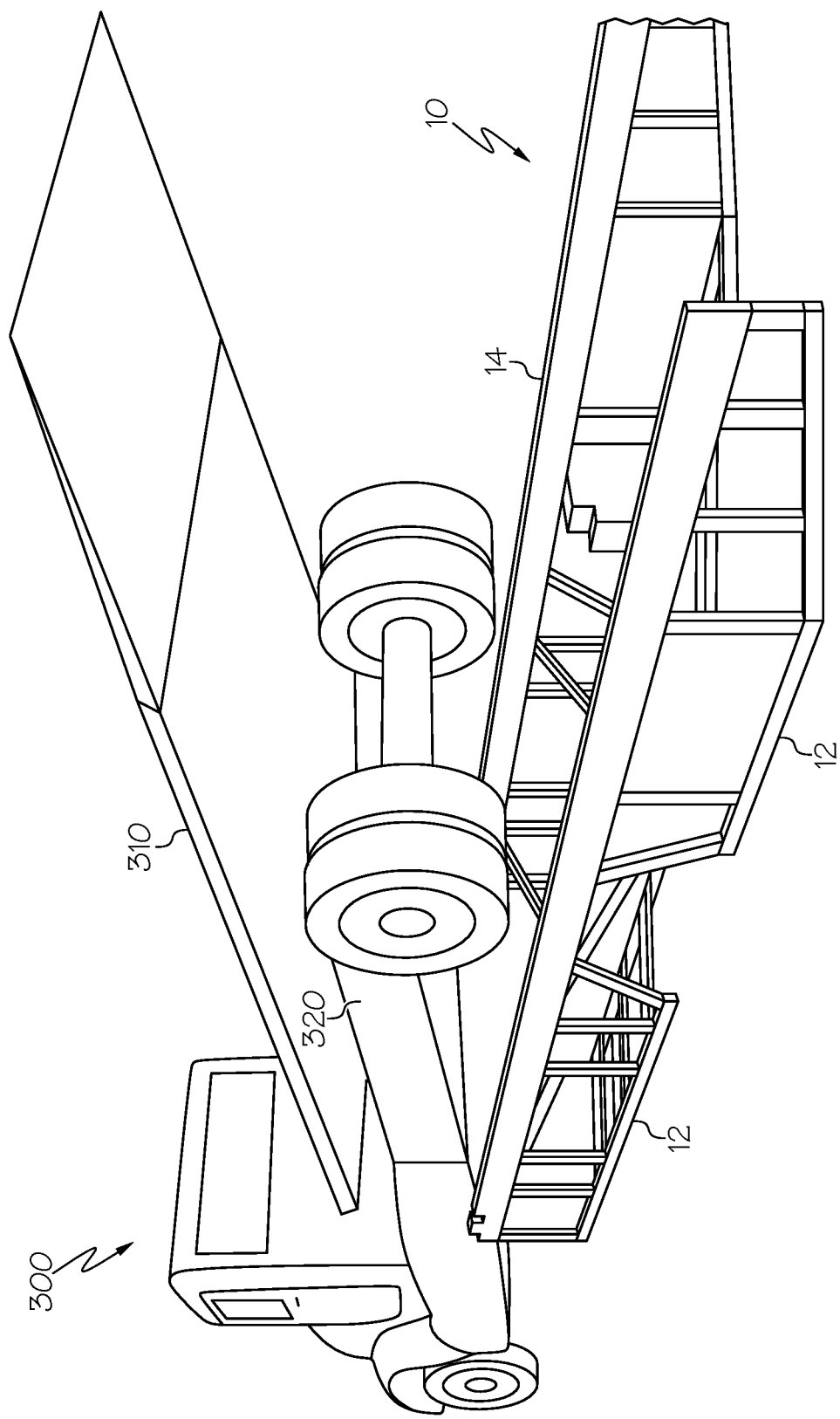
FIG. 14 is a left rear perspective view of a flatbed tow truck and a frame being assembled.
Figure 15:
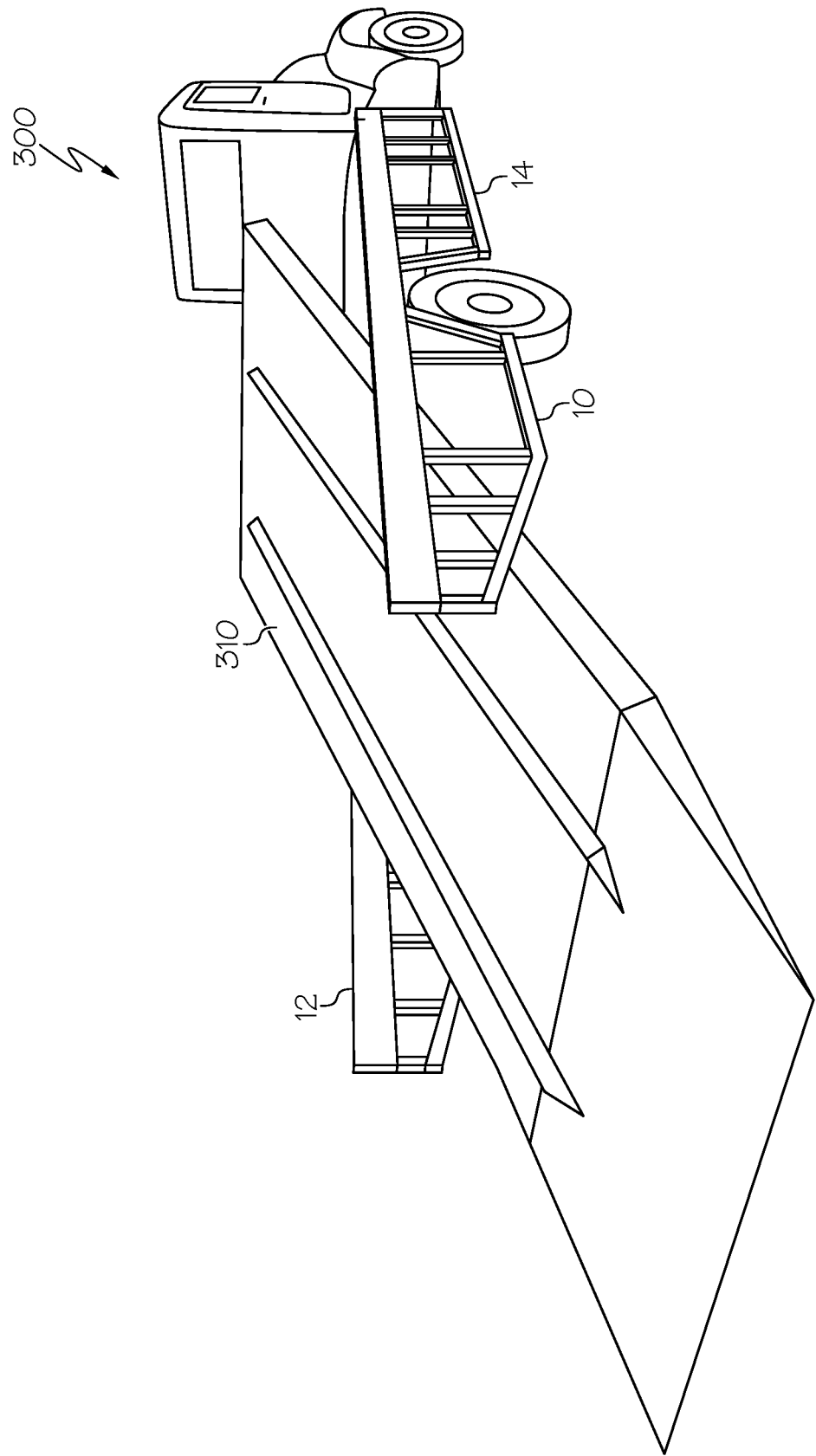
FIG. 15 is a right rear perspective view of a flatbed tow truck and a frame assembled together with a flat bed of the flatbed tow truck in an extended position.
Figure 16:
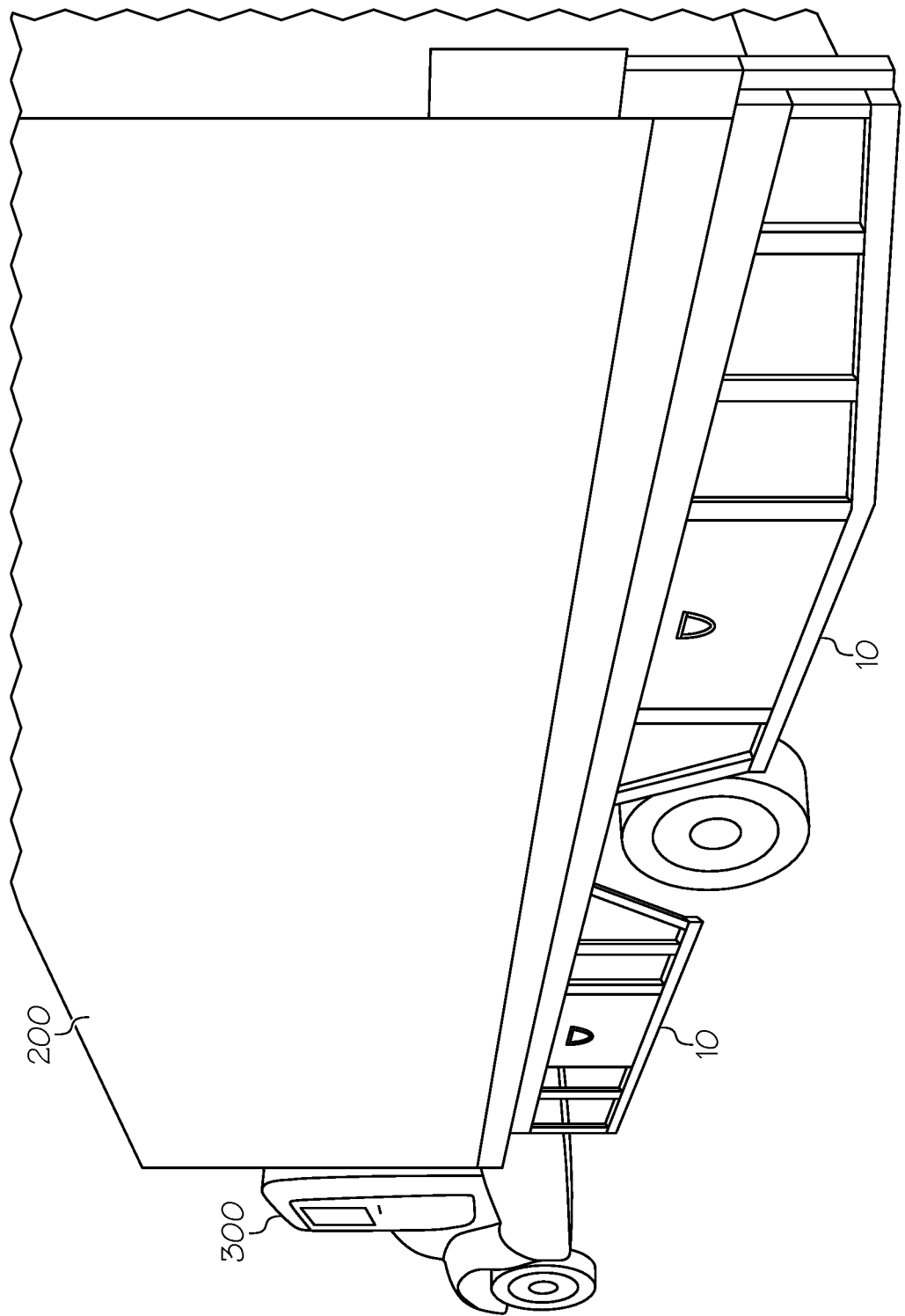
FIG. 16 is a left rear perspective view of a flatbed tow truck and a frame assembled together with a box compartment attached to the frame over and around a flat bed of the flatbed tow truck.
Figure 17:
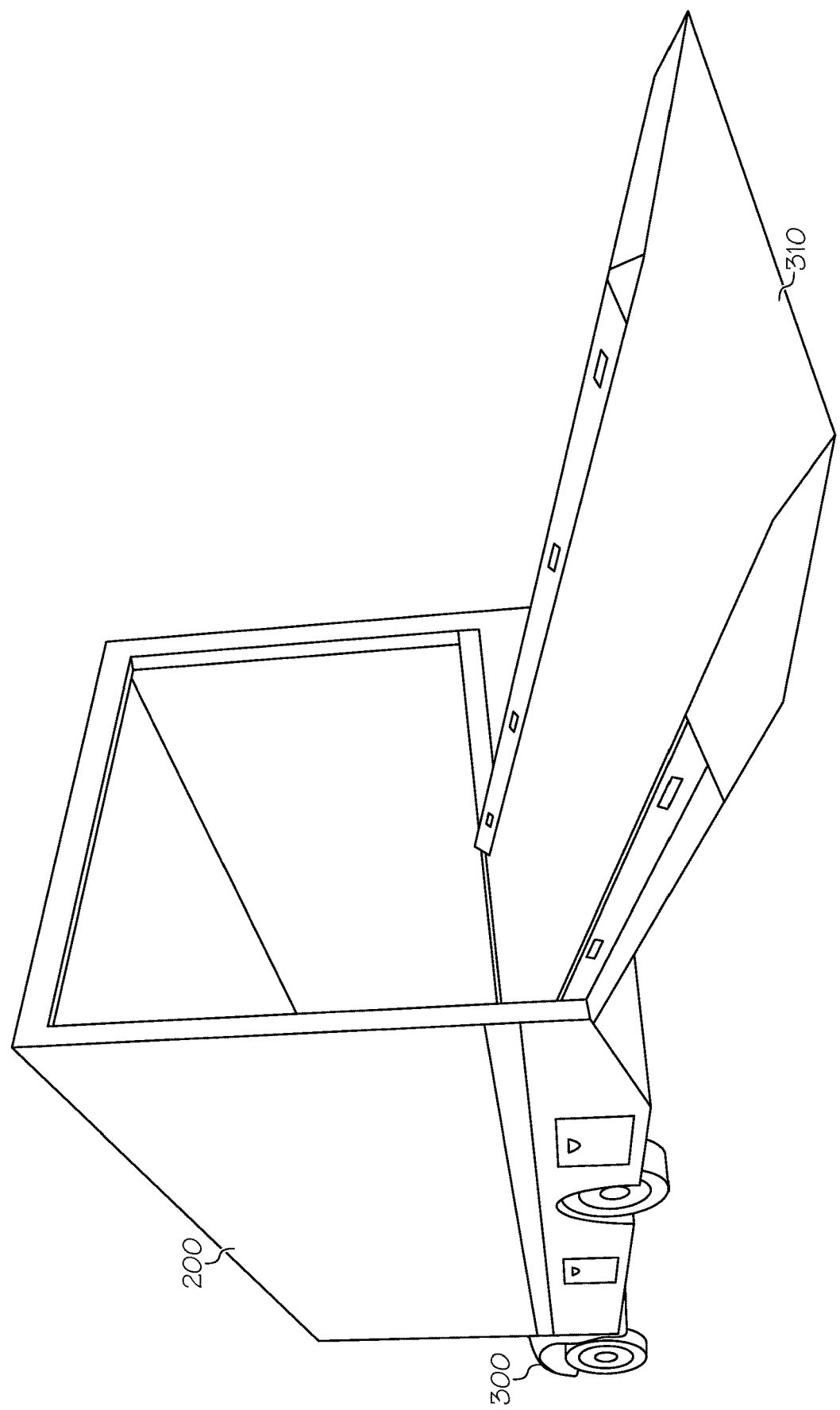
FIG. 17 is a left rear perspective view of a flatbed tow truck and a frame assembled together with a box compartment attached to the frame over and around a flat bed of the flatbed tow truck, wherein the flat bed is in an extended position.

As mentioned above, the frame 10 may also include one or more central connection elements 22. The one or more central connection elements 22 may serve as connection points at and to which the frame 10 is attached to the chassis 320 of the truck 300. The one or more central connection elements 22 are connected to one or more of the at least two cross-beams 16 and extend vertically or diagonally upward therefrom as shown in FIG. 13. In some embodiments, each central connection element 22 can be a horizontal beam connected perpendicularly between two cross-beams 16. In other embodiments, each central connection element 22 can be a horizontal beam connected perpendicularly between two stabilization beams 20. In still other embodiments, each central connection element 22 may include a horizontal beam having two or more vertical legs 22a, wherein each vertical leg connects to an adjacent cross-beam 16 of the frame 10. In these latter embodiments, the vertical legs 22a are used to attach the central connection element 22 in a horizontal and perpendicular orientation to two opposing cross-beams 22. The frame 10 can include two central connection elements 22 in exemplary embodiments. In other embodiments, the frame 10 can include one, three, four, five, six, or more central connection elements 22.

In some exemplary embodiments, the central connection elements 22 can be attached to a first end of one or more horizontal elements 24 that connect at a second end to the left (or right) side structure 12 or 14, e.g., to the at least one left (or right) horizontal connection beam 12b or 14b of the left (or right) side structure. In other embodiments, one or more of the horizontal elements 24 may be connected at the second end(s) to one or more of the two or more left (or right) side vertical support beams 12c or 14c. The one or more horizontal elements 24 serve to stabilize the position of the one or more central connection elements 22 when the one or more central connection elements are attached to the chassis 320 of the truck 300.

One embodiment of the frame 10 is described in the following paragraphs. The frame 10 includes at least one left and at least one right side support beams 12a, 14a, at least one left and at least one right horizontal connection beams 12b, 14b, two or more left side and two or more right side vertical support beams 12c, 14c, at least two cross-beams 16, and at least one vertical connection beam 18. In exemplary embodiments, the frame 10 has one left and one right side support beam 12a, 14a and one left and one right horizontal connection beam 12b, 14b. In exemplary embodiments, the frame 10 has two, three, four, five, six, or more cross-beams 16. In exemplary embodiments, the frame 10 includes one vertical connection beam 18 at each corner of the frame, wherein the four corners of the frame are the points at which the side support beams 12a, 14a and horizontal connection beams 12b, 14b terminate. In exemplary embodiments, the frame 10 includes a plurality (2, 3, 4, 5, 6, 7, 8, 9, 10, 11, 12, 13, 14, 15, 16, 17, 18, 19, 20, or more) of vertical support beams 12c, 14c connected generally vertically between each pair of side support beam and horizontal connection beam, e.g., between the left side support beam 12a and the left horizontal connection beam 12b on the left side of the frame and between the right side support beam 14a and the right horizontal connection beam 14b on the right side of the frame.

The at least one left and at least one right side support beams 12a, 14a are connected to the at least two cross-beams 16 to form a lower portion of the frame 10. The at least one left and at least one right horizontal connection beams 12b, 14b are connected to their corresponding (left or right) side support beams 12a or 14a by the vertical support beams 12c or 14c. The at least one left side support beam 12a and the at least one left horizontal connection beam 12b are arranged parallel to one another on a longitudinal axis relate to the position of the chassis 320 on a left side of the tow truck 300. Similarly, the at least one right side support beam 14a and the at least one right horizontal connection beam 14b are arranged parallel to one another on a longitudinal axis relate to the position of the chassis 320 on a right side of the tow truck 300.

Each cross-beam 16 is connected to the chassis 320 of the flatbed tow truck 300 in a horizontally perpendicular orientation relative to the longitudinal axis of the chassis 320 and is further connected at a first end generally perpendicularly to the left side support beam 12a and at a second end generally perpendicularly to the right side support beam 14a. In one exemplary embodiment, the cross-beams 16 are connected at various points to the chassis 320 using plates (e.g., steel plates) that are welded both to the cross-beam and to the chassis. In some embodiments, each cross-beam 16 is a single, unitary beam. In other embodiments, each cross-beam 16 is constructed from two or more beams welded together. For example, in one embodiment, a cross-beam is constructed from two beams at each end of the cross-beam in the same lower plane relative to one another with a third beam connecting them together in the center by connection of a bottom surface at each end of the third beam to top surfaces at facing ends of the two coplanar beams. In this arrangement, the third beam is positioned on a different, higher plane than that of the two coplanar beams. The construction of this embodiment is useful for avoiding contact between the frame 10 and parts of the tow truck 300 such as a driveshaft or exhaust system.

Unlike the other beams of the frame, the beams used for cross-beams 16 may of the same types as those used for the frame's other beams, or in exemplary embodiments, may be solid, flat beams.

Each vertical connection beam 18 is connected to either the left or right horizontal connection beam 12a or 14a and is oriented generally vertically for attachment of a box compartment 200 to the frame 10. For example, each corner (i.e., four corners in total) of the frame 10 may include a vertical connection beam 18 that is attached to the side support beam (e.g., left or right side support beam 12a or 14a) or to the horizontal connection beam (e.g., left or right horizontal connection beam 12b or 14b) that is adjacent to it at the corner. In exemplary embodiments, the vertical connection beam 18 at each corner of the frame 10 may be attached at or near one end to the adjacent side support beam 12a or 14a and at or near a generally central portion of the vertical connection beam to the adjacent horizontal connection beam 12b or 14b. An upper portion of the vertical connection beam 18 extends upward above the horizontal connection beam 12a or 14a to allow for attachment to, over, or within a securement apparatus of the box compartment 200.

As shown in the drawings, for example, a portion of the box compartment 200 can be formed into a securement apparatus that includes a hollow interior space for receiving an upper portion of one of the vertical connection beams 18. The securement apparatus of the box compartment 200 and the vertical connection beam 18 may be even more securely connected together by welding them directly together, by welding a plate to connect one to the other, or by use of one or more pins, rivets, or other fasteners. Using such a configuration in each of the corners of the frame, the box compartment 200 may be securely fastened to the frame 10.

As mentioned above, the at least one left side support beam 12a is connected to the at least one left horizontal connection beam 12b by the two or more left side vertical support beams 12c. Similarly, the at least one right side support beam 14a is connected to the at least one right horizontal connection beam 14b by the two or more right side vertical support beams 14c.

To further secure the box compartment 200 to the frame 10, one or more panels may be fastened to the horizontal connection beam (left or right, 12b or 14b, depending on the side) at a lower end and to the box compartment at an upper end. In exemplary embodiments, a securement panel that is near to or equal in length to the box compartment 200 is fastened at an upper portion to the box compartment and at a lower end to the horizontal connection beam (left or right, 12b or 14b, depending on the side). Use of such securement panels prevents entry of weather, animals, persons, road debris, or other objects under the box compartment and into its interior space where the transported automobile sits upon the flat bed of the flatbed tow truck. The securement panels also assist in preventing lifting of box compartment due to wind or air turbulence during driving of the tow truck.

The frame 10 may also include one or more stabilization beams 20. The stabilization beams 20 may be oriented diagonally or perpendicularly in their connection to other beams of the frame 10. For example, in one embodiment, a stabilization beam 20 may be connected in a generally horizontal orientation diagonally between one of the side support beams 12a or 14a and one of the cross-beams 16. In another example, a stabilization beam 20 may be connected in a generally horizontal orientation perpendicularly between two of the cross-beams 16. In still another example, a stabilization beam 20 may be connected in a diagonally vertical orientation between one of the horizontal connection beams 12b or 14b and one of the cross-beams 16.

The beams may be constructed from steel tubing that surrounds a hollow interior space. The steel tubing may be square or rectangular in cross section, although in some embodiments, the steel tubing may have a different cross-sectional shape such as circular. The beams are welded together when the frame is constructed.

Connections between the beams and various other parts of the frame are accomplished using welding. In most exemplary embodiments, steel plates are welded to connect one beam to another beam.

Once fastened to the frame 10, the box compartment 200 encloses an interior space sized so as to be capable of sheltering within it an automobile being transported or stored on the flat bed 310 of the flatbed tow truck 300. The box compartment 200 may also be sized large enough to be capable of housing a work space at one side, e.g., at a front side that faces the cab of the tow truck. The work space may be sufficiently sized for installation of tool boxes, work benches, or other equipment.

The invention also relates to a frame assembly for supporting and mounting a box compartment 200 mounted over and around a flat bed 310 of a tow truck 300. The frame assembly includes a frame 10 (as described elsewhere herein) attached to a chassis 320 of a tow truck 300. The frame assembly also includes a box compartment 200 that is attachable to the frame 10. In an exemplary embodiment of the frame assembly, the frame 10 includes at least one left side support beam 12a, at least one right side support beam 14a, at least one left horizontal connection beam 12b, at least one right horizontal connection beam 14b, two or more left side vertical support beams 12c, and two or more right side vertical support beams 14c. The frame 10 also includes at least two cross-beams 16, wherein each cross-beam is connected to the chassis 320 of the tow truck 300 and is further connected at a first end generally perpendicularly to the left side support beam 12a and at a second end generally perpendicularly to the right side support beam 14a. The frame 10 also includes at least one vertical connection beam 18, wherein each vertical connection beam is connected to either the left or right horizontal connection beam 12a or 14a and is oriented generally vertically for attachment of a box compartment 200 to the frame. The at least one left side support beam 12a is connected to the at least one left horizontal connection beam 12b by the two or more left side vertical support beams 12c. The at least one right side support beam 14a is connected to the at least one right horizontal connection beam 14b by the two or more right side vertical support beams 14c.

In the frame 10 of the frame assembly, the at least one vertical connection beam 18 can include front left, front right, rear left, and rear right vertical connection beams. The front left, front right, rear left, and rear right vertical connection beams 18 are connectable to the box compartment 200 at or near corresponding front left, front right, rear left, and rear right corners of the box compartment.

The frame 10 of the frame assembly can further include one or more stabilization beams 20 for bracing a left side structure 12 of the frame assembly, a right side structure 14 of the frame assembly, the at least two cross-beams 16, the at least one vertical connection beam 18, or a combination of two or more of the foregoing. Each stabilization beam 20 connects between two other beams of the frame assembly. The left side structure 12 is or includes the at least one left side support beam 12a, the at least one left horizontal connection beam 12b, and the two or more left side vertical support beams 12c. The right side structure 14 is or includes the at least one right side support beam 14a, the at least one right horizontal connection beam 14b, and the two or more right side vertical support beams 14c. Each of the one or more stabilization beams 20 is oriented diagonally or perpendicularly in its connection between two other beams of the frame assembly.

The box compartment 200 can include two or more side walls and a roof attached to them. For example, the box compartment 200 can include left and right side walls. In some embodiments, the box compartment 200 can include a front side wall connected between the left and right side walls near a cab of the truck 300. In exemplary embodiments, the box compartment 200 can include left, right, and front side walls and a door at a rear end of the box compartment near a rear end of the chassis 320 and frame 10. The door may be hinged, roll-up, or any other suitable type of door. The door may be a single door or double doors. The door or doors are openable and closeable to access and secure the enclosed space within the box compartment when the frame assembly is installed on the truck. In all exemplary embodiments, the box compartment 200 includes a roof.

The side walls of the box compartment 200 may be constructed from a rigid material (e.g., metal, alloy, wood, hard plastic, or composite material) or from a non-rigid material such as cloth or plastic sheeting. The roof and door(s) of the box compartment 200 may be constructed from any of the same materials. The box compartment 200 can include rigid structural elements to form the shape of the side walls, roof, and door(s) to which the materials above are fixed to complete the side walls, roof, and door(s).

The invention also relates to a system that includes a flatbed tow truck 300, a frame 10 as described herein above attached to a chassis 320 of the tow truck, and a box compartment 200 attached to the frame to enclose a flat bed 310 of the tow truck. In exemplary embodiments, the flatbed tow truck is of the rollback type having a flat bed that may be extended and retracted relative to the chassis of the truck. The combination flatbed tow truck and box compartment system is useful for transporting an object in an enclosed space defined within the box compartment. The object can be a vehicle (e.g., an automobile, a motorcycle, an all-terrain vehicle (e.g., a four-wheeler or a utility vehicle), or a tractor) or any other object requiring transport and for which transportation in a protected, enclosed space is desirable. As described elsewhere herein, the box compartment 200 includes a roof and at least two walls. The roof and at least two walls define an enclosed space into which the object is placeable for transport or storage. The frame 10 is connectable to a bottom side of the chassis 320 of the flatbed tow truck 300 to support and secure the box compartment 200 over the flat bed 310.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A combination flatbed tow truck and box compartment system for transporting an object, wherein the system comprises:
    a flatbed tow truck comprising a flat bed and a chassis;
    a box compartment comprising a roof and at least two walls, wherein the roof and at least two walls define an enclosed space into which the object is placeable for transport or storage;
    a frame that is connectable to a bottom side of the chassis of the flatbed tow truck to support and secure the box compartment over the flat bed; wherein the frame comprises:
        a left side structure, wherein the left side structure is oriented generally vertically, and wherein the left side structure is connectable to and supports a left side of the box compartment;
        a right side structure, wherein the right side structure is oriented generally vertically, and wherein the right side structure is connectable to and supports a right side of the box compartment;
        at least two cross-beams, wherein each cross-beam is connected at a first end generally perpendicularly to the left side structure and at a second end generally perpendicularly to the right side structure; and
        at least one vertical connection beam, wherein each vertical connection beam is connected to or is an integral part of either the left or right side structure, and wherein each vertical connection beam is oriented generally vertically for attachment of the box compartment to the frame.

2. The system of claim 1, wherein the at least one vertical connection beam comprises front left, front right, rear left, and rear right vertical connection beams; and wherein the front left, front right, rear left, and rear right vertical connection beams are connectable to the box compartment at or near corresponding front left, front right, rear left, and rear right corners of the box compartment.

3. The system of claim 1, further comprising one or more stabilization beams for bracing the left side structure, the right side structure, the at least two cross-beams, the at least one vertical connection beam, or a combination of two or more of the foregoing; wherein each stabilization beam connects between two other beams of the system; wherein the left side structure comprises at least one left side support beam, at least one left horizontal connection beam, and two or more left side vertical support beams; wherein the right side structure comprises at least one right side support beam, at least one right horizontal connection beam, and two or more right side vertical support beams; and wherein each of the one or more stabilization beams is oriented diagonally or perpendicularly in its connection between two other beams of the system.

4. The system of claim 1, wherein the frame further comprises one or more central connection elements for attaching the frame to the chassis, wherein the one or more central connection elements are connected to one or more of the at least two cross-beams and extend vertically or diagonally upward therefrom.

* * * * *